United States Patent
Kawano et al.

(10) Patent No.: US 6,832,966 B2
(45) Date of Patent: Dec. 21, 2004

(54) PLASTIC MOVABLE GUIDE FOR TRANSMISSION DEVICE

(75) Inventors: Atsushi Kawano, Osaka (JP); Junya Kurohata, Osaka (JP); Tatsuya Konishi, Osaka (JP)

(73) Assignee: Tsubakimoto Chain Co. (JP)

( * ) Notice: Subject to any disclaimer, the term of this patent is extended or adjusted under 35 U.S.C. 154(b) by 146 days.

(21) Appl. No.: 10/269,736

(22) Filed: Oct. 11, 2002

(65) Prior Publication Data

US 2003/0078122 A1 Apr. 24, 2003

(30) Foreign Application Priority Data

Oct. 23, 2001 (JP) ........................................ 2001-325529

(51) Int. Cl.[7] ................................................. F16H 7/08
(52) U.S. Cl. ..................................... 474/111; 474/140
(58) Field of Search ........................ 474/109–111, 140, 474/144

(56) References Cited

U.S. PATENT DOCUMENTS 4,826,468 A * 5/1989 Friedrichs .................. 474/140
4,832,664 A * 5/1989 Groger et al. .............. 474/111
5,318,482 A * 6/1994 Sato et al. .................. 474/111

FOREIGN PATENT DOCUMENTS

| JP | 10-311395 A | * 11/1998 | ............. F16H/7/18 |
| JP | 3253951 | 11/2001 | |
| JP | 2001-311457 A | * 11/2001 | ............. F16H/7/18 |
| WO | WO 97/37154 A1 | * 10/1997 | ............. F16H/7/08 |

* cited by examiner

*Primary Examiner*—Marcus Charles
(74) *Attorney, Agent, or Firm*—Howson and Howson

(57) ABSTRACT

A plastic movable guide for a chain or other traveling transmission medium, comprises a guide body composed of a shoe and a slotted plate-receiving portion integrally molded as a unit from a resin, and a reinforcing plate inserted into the slot. A mounting hole adjacent one end of the guide body is aligned with a hole adjacent one end of the reinforcing plate. The diameter of the hole in the reinforcing plate is larger than the diameter of the mounting hole in the guide body, so that the inner periphery of the hole in the reinforcing plate does not extend inward past the edge of the mounting hole. The guide so configured exhibits excellent quietness and assembly efficiency and can be produced at a relatively low cost.

2 Claims, 6 Drawing Sheets

PLASTIC MOVABLE GUIDE FOR TRANSMISSION DEVICE

CROSS-REFERENCE TO RELATED APPLICATION

This application claims priority from Japanese patent application 325529/2001, filed in Japan on Oct. 23, 2001.

FIELD OF THE INVENTION

This invention relates to a plastic movable guide for a power transmission in which an endless chain transmits power from a driving sprocket to a driven sprocket or an endless belt transmits power from a driving pulley to a driven pulley. The guide may be used, for example, as a fixed guide, or as a pivotally mounted tensioner lever.

BACKGROUND OF THE INVENTION

Many engines, and other machines in which mechanical power is transmitted from one shaft to another, include a circulating transmission device, comprising a chain, a belt, or the like as shown in FIG. 10. A movable guide Ga, on which the transmission medium C slides, may be used, in cooperation with a tensioner T, to impart appropriate tension to the transmission medium, and also to prevent vibration in the plane of circulation of the transmission medium and also transverse vibration. The movable guide Ga is ordinarily attached to a frame E of the engine or other machine by a supporting shaft P, which may be a mounting bolt, a pin, or the like. In FIG. 10, an endless, circulating transmission medium is engaged with a driving sprocket S1, driven sprockets S2, and a fixed guide Gb for guiding, and limiting the traveling path of, the circulating transmitting medium C.

FIGS. 8 and 9 show a plastic movable guide 300, used as a tensioner lever in a transmission device utilizing a chain, as described in present inventors' previously filed Japanese Patent Application No. 2000-382798.

In this plastic movable guide 300, a guide body 301 includes a shoe 302. A transmitting medium C, such as a traveling chain, belt or the like, is in sliding contact with a surface of the shoe. A plate-receiving portion 303, provided on the back of the shoe 302, and extending along the longitudinal direction of the guide, is molded of synthetic resin as a unit with the shoe. A reinforcing plate 308, composed of a rigid material which reinforces the guide body 301, fits into a slot 307, which opens in an edge of the plate-receiving portion 303 along the longitudinal direction of the guide, and faces in a direction opposite to the direction in which the chain-engaging surface of the shoe faces. A mounting hole 305, for mounting on the frame of an engine, or other machine, is provided at a fixed end of the plate-receiving portion 303. A through hole 308A is also provided at one end of the reinforcing plate 308. The through hole is positioned and fastened, together with the mounting hole 305 in the guide body 301, on a shaft such as a mounting bolt or the like, with the reinforcing plate 308 fitting into the slot 307.

In the above-described plastic movable guide 300, the shoe 302 and the plate-receiving portion 303 are integrally molded as a unit from a synthetic resin. The guide body 301 itself performs a sliding function, and it is not necessary to provide a separate shoe member. Therefore, the number of the parts and the number of production steps is minimized. Furthermore, since a slot 307 opens at an edge of the plate-receiving portion 303 in the guide body 301 along the longitudinal direction of the guide, and the reinforcing plate 308 fits into the slot 307, the strength of the plastic movable guide in the pivoting direction is increased, and its bending rigidity, toughness, strength are significantly improved.

A mounting hole, for mounting the guide on a frame of an engine, a drive, or the like, is provided adjacent a fixed end of the guide body, and a through hole, which is positioned in register with the mounting hole of guide body, is provided adjacent one end of the reinforcing plate, so that the guide body and reinforcing plate can be fastened together on a supporting shaft, such as a mounting bolt, pin, or the like, which extends through both holes. Thus, both the guide body and the reinforcing plate can be pivotally rotated about a mounting axis while cooperating with each other without the reinforcing plate becoming disassembled from the guide body. Furthermore, since the reinforcing plate is only connected to the guide body by the supporting shaft adjacent one end of the reinforcing plate, and fits into the slot of the guide body, even if there is a difference between the coefficients of thermal expansion of the guide body and the reinforcing plate, the reinforcing plate and guide body are free to move relative to each other in the longitudinal direction of the guide, and thermal shape deformation and resulting breakage are avoided.

In the conventional plastic movable guide 300, the relationships between the respective sizes and shapes of the mounting hole 305 bored in the guide body 301 and the through hole 308A bored in the reinforcing plate 308, are not considered, and the diameter of the mounting hole 305 is set to be the same as that of the through hole 308A by design. However, a variation in working accuracy in production, and a difference between the coefficients of thermal expansion of the materials made the diameter of the hole 308A in the reinforcing plate smaller than the diameter of the hole 305 in the guide body, causing the edge of the through hole 308A to protrude inward past the inner periphery of the hole 305.

When the conventional plastic movable guide is attached to the frame of an engine and used as a tensioner lever, objectionable metallic noise and transverse vibration are generated, both exceeding the noise and vibration generated when a plastic movable guide composed only of resin was used. A solution to these problems is desirable in view of requirements for reduced engine noise.

Furthermore, in the conventional plastic movable guide, the reinforcing plate can seize on its supporting shaft due to friction. Friction between the reinforcing plate and its supporting shaft can also cause wear, generating metal powder, the presence of which inside an engine can lead to engine failure. Thus, it has been necessary to subject the reinforcing plate to a preliminary strengthening process such as heat treatment in order to enhance its wear resistance. The necessity of preliminary treatment results in an increase in production cost. Furthermore, subjecting the reinforcing plate to a strengthening process such as heat treatment or the like, causes distortion of the reinforcing plate, impairing the ability of the reinforcing plate to fit easily into the slot of the guide body, and potentially reducing assembly efficiency. Thus, improvements are also desirable to avoid seizing, wear, increased production cost and reduced efficiency of assembly.

The inventors have studied and analyzed the causes of metallic noise generation, transverse vibration, wear of the reinforcing plate and seizing of the plate on its supporting shaft. As a result of their studies, the inventors have unexpectedly found that these problems do not occur in all plastic movable guides, but occur only where the diameter of the through hole bored in the reinforcing plate is smaller than that of the mounting hole bored in the guide body, or in where a part of the inner periphery of the through hole in the reinforcing plate protrudes inwardly past the inner periphery of the mounting hole in the guide body. Thus, the inventors have determined that the above-mentioned problems result from direct contact between the support shaft, that is the mounting bolt, pin, or the like, and the inner periphery of the through hole bored in the reinforcing plate.

Accordingly, the objects of the invention are to solve the above-mentioned problems encountered in the production and use of prior art plastic movable guides, and to provide a plastic movable guide having excellent quietness, improved assembly efficiency, and reduced production cost.

SUMMARY OF THE INVENTION

The guide in accordance with the invention comprises an elongated guide body composed of an elongated shoe having a front surface for sliding contact with a power transmission medium and a back side. A plate-receiving portion extends longitudinally along the back side of the shoe and has a longitudinally extending slot open in a direction opposite to the direction in which the front surface of the shoe faces. The shoe and plate-receiving portion are integrally molded as a unit from a synthetic resin. A reinforcing plate fits into the slot.

The guide body has a mounting hole adjacent one end thereof, and the reinforcing plate has a through hole adjacent one of its ends. When the reinforcing plate is seated in the slot, the elongated mounting hole and the through hole are substantially coaxial with each other so that an attachment means, inserted through the mounting and through holes, can support the guide body and reinforcing plate on a frame of an engine. The structure is characterized by the fact that the diameter of the through hole in the reinforcing plate is greater than the diameter of the mounting hole in the guide body.

In a preferred embodiment, a locking means is provided for positioning and locking the through hole and the mounting hole in coaxial relationship.

The resin material forming the guide body is not especially limited. However, since the contact sliding surface of the guide body with a chain, a belt, or the like functions as a shoe, the material is preferably a so-called "engineering plastic," such as a polyamide type resin having high wear resistance and good lubricating properties. A fiber-reinforced resin may be used for the entire guide body, or may be used concurrently another plastic material. The material of the reinforcing plate is also not especially limited, but the reinforcing plate must have sufficient bending rigidity and strength to function effectively as a reinforcement for the plastic movable guide. Iron-based metals such as cast iron, stainless steel and the like, nonferrous metals such as aluminum, magnesium, titanium and the like, engineering plastics such as polyamide type resin and the like, and fiber reinforced plastics are preferably used as materials for the reinforcing plate.

The plastic movable transmission guide according to the invention, having the above-described configuration, exhibits the following unique effects.

First, because the diameter of the through hole bored in the reinforcing plate is larger than that of the mounting hole of the guide body, the through hole and the mounting hole may be fastened together on a shaft such as a mounting bolt or the like. When the guide is mounted on the shaft, the shaft is engaged with the inner surfaces of a pair of opposed parts of the mounting hole of the guide body, but does not contact the inner periphery of the through hole bored in the reinforcing plate. Therefore, the occurrence of objectionable metallic noise and wear of the reinforcing plate are avoided. Further, since the shaft support means is supported by the inner walls of parts of the mounting hole on both sides of the reinforcing plate, transverse vibration is significantly reduced.

If the through hole bored in the reinforcing plate and the mounting hole bored in the guide body are positioned and locked so that they are on the same axis, even if the guide is subjected to excessive vibration, deformation of the reinforcing plate is prevented, and contact of the inner periphery of the through hole with the supporting shaft can be reliably avoided.

DETAILED DESCRIPTION OF THE PREFERRED EMBODIMENTS

Figure 1:
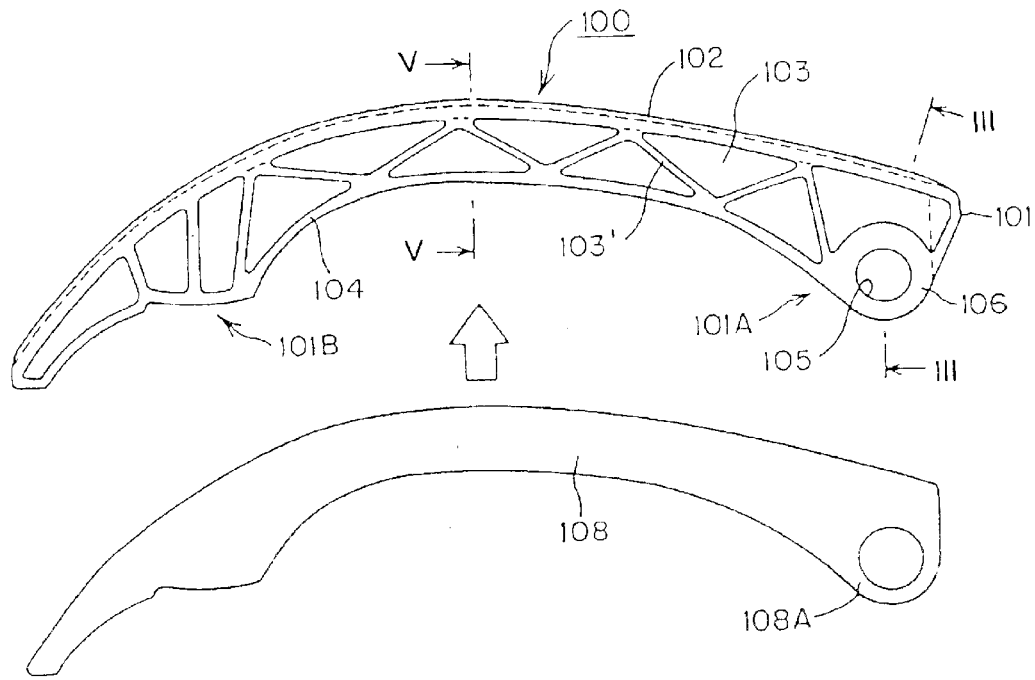
FIG. 1 is an exploded view of a movable guide, in accordance with a first embodiment of the invention.
Figure 2:
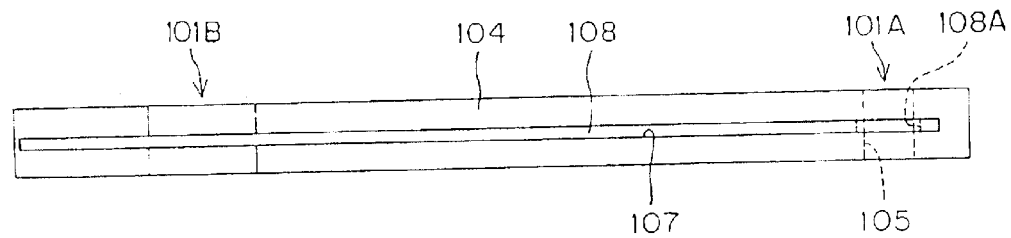
FIG. 2 is a bottom plan view of the guide body shown in FIG. 1.

A first embodiment of the invention will be described with reference to FIGS. 1 to 5. As shown in FIG. 1, a movable guide 100 is formed by incorporating a reinforcing plate 108 into a guide body 101 in the direction of the arrow.

The guide body 100 is a plastic body integrally molded as a unit from a synthetic resin, and comprises a shoe 102 having, on one side, a surface for sliding contact with a chain, and having, on its opposite side, a plate-receiving portion 103 extending longitudinally along the length of the guide. A flange 104 is formed at an edge of the plate-receiving portion 103 along the longitudinal direction of the guide, and a boss portion 106 is formed adjacent one end of the guide. The boss has a mounting hole 105 for pivotally mounting the guide on a frame of an engine, drive mechanism or the like by means of a supporting shaft such as a mounting bolt or the like.

A truss-shaped arrangement of reinforcing ribs 103' is formed on a side portion of the plate-receiving portion 103. A slot 107 extends along the longitudinal direction of the guide. The opening of the slot is in flange 104 and faces in the direction opposite to the direction in which the chaincontacting surface of the shoe faces, as can be seen from FIGS. 3 to 5. To reinforce the guide body 101, a reinforcing plate 108, made of a rigid material, is fitted into the slot 107 from the side opposite the side on which the shoe 102 is formed.

Figure 3:
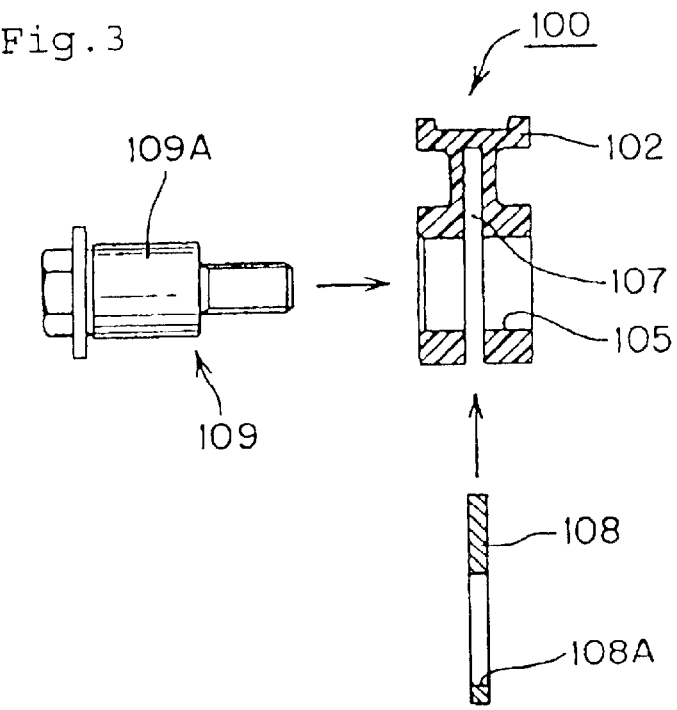
FIG. 3 is an exploded cross-sectional view taken on surface III—III in FIG. 1.
Figure 4:
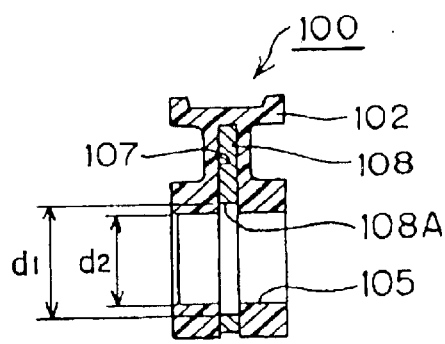
FIG. 4 is a cross-sectional view taken on surface III—III in FIG. 1, showing the guide body and reinforcing plate in an assembled condition.
Figure 5:
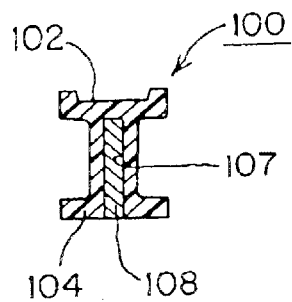
FIG. 5 is a cross-sectional view taken on surface V—V in FIG. 1.

As shown in FIG. 1 and FIG. 3, a through hole 108A, having a diameter d1 larger than diameter d2 of the mounting hole 105, is bored in the reinforcing plate 108 at a position such that, when the plate is inserted into the slot 107, the center axis of the through hole 108A coincides with the center axis of the mounting hole 105 of the guide body 101.

The diameter d1 of the through hole may exceed the diameter d2 of the mounting hole to any degree provided that the through hole 108A can be reliably supported by the inner wall of the mounting hole 105 without contact between the shaft support means 109 and the inner periphery of the through hole 108A. In this example, the through hole and the mounting hole each have a circular shape. However, so long as the inner periphery of the through hole does not extend inward past the edge of the mounting hole, that is, so long as an axial projection of the mounting hole is entirely within the boundary of the through hole in the reinforcing plate when the guide body and the reinforcing plate are in the assembled condition, the shape of the through hole 108A may be varied. For example, an elongated hole, or an oval hole having different lengths in the vertical and horizontal directions, may be used. For optimum efficiency in the assembly of the guide in which the through hole in the reinforcing plate is an elongated or oval hole, it is desirable to bore the through hole so its long dimension extends in the direction of insertion of the reinforcing plate, as shown in FIG. 1. The shorter dimension of the elongated or oval hole must, of course, be greater than the diameter of the mounting hole in guide body.

The plastic movable guide, into which the reinforcing plate 108 is inserted, may be mounted on a frame of an engine, a drive mechanism or the like, by means of a shoulder bolt 109, having a pivot support portion 109A as shown in FIG. 3, or a mounting pin provided on the frame. The guide body 101 and the reinforcing plate 108 are penetrated by the bolt or pin, and fastened together with each other.

In this case, since the through hole 108A is on the same center axis with the mounting hole 105 of the guide body 101, and the reinforcing plate 108 is fastened and supported by a shaft support means 109 such as a mounting bolt, mounting pin, or the like, even if there is a difference between the coefficients of thermal expansion of the guide body 101 and the reinforcing plate 108, both the guide body 101 and the reinforcing plate 108 are free to expand and contract relative to each other in the longitudinal direction of the guide. Thus, shape deformation due to thermal expansion or the like is avoided, and no breakage occurs.

A locking means (not shown in FIGS. 3 and 4) for positioning and locking the through hole 108A and the mounting hole 105 together on the same center axis, is provided, near the boss portion 106, on a plane where the reinforcing plate 108 and the guide body 101 are opposed to each other. By way of example, the locking means comprise mutually engageable projections and depressions, or may comprise a hole and a hook, or the like. An example of a locking means is illustrated, and described below, in connection with a second embodiment of the invention.

When the reinforcing plate is inserted and fitted into the slot 107 of the guide body 101, the provision of such a locking means allows the through hole 108A and the mounting hole 105 to be positioned on the same center axis. Even when extreme vibration is applied to the guide body 101 and the reinforcing plate 108 during use, the locking means reliably prevents contact between the supporting shaft and the inner periphery of the through hole 108A for a long period of time, so that the center axes of the through hole 108A and the mounting hole 105 do not shift relative to each other.

Figure 6:
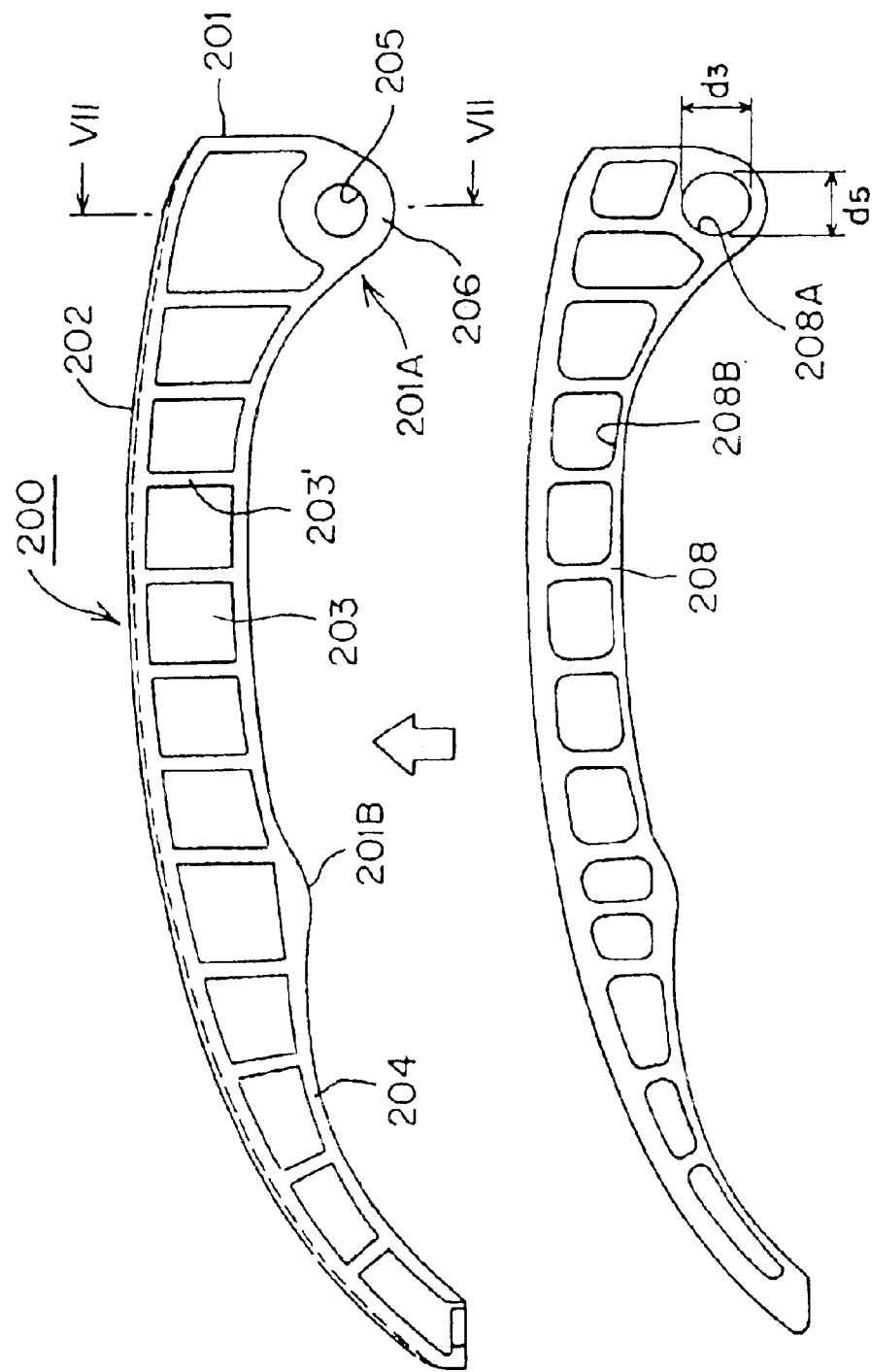
FIG. 6 is an exploded view of a movable guide, in accordance with a second embodiment of the invention.

A second-embodiment of the invention will be described with reference to FIGS. 6, 7(a) and 7(b). As shown in FIG. 6, a plastic movable guide 200 is formed by inserting a reinforcing plate 208 into a guide body 201 in the direction of the arrow.

Reinforcing ribs 203' are provided on the exterior of a plate-receiving portion 203 so that they extend in a substantially perpendicular direction with respect to a shoe 202. However, the shapes of the reinforcing ribs may be appropriately selected in consideration of requirements of strength and moldability. To reduce the overall weight of the guide, through holes 208B are punched in the reinforcing plate 208.

Figure 7A:
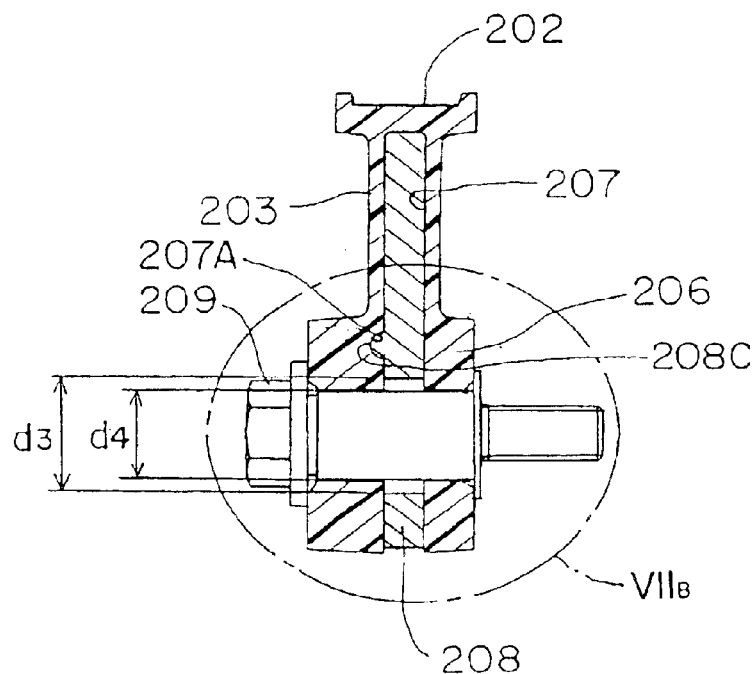
FIG. 7(a) is a cross-sectional view taken on plane VII—VII in FIG. 6.
Figure 7B:
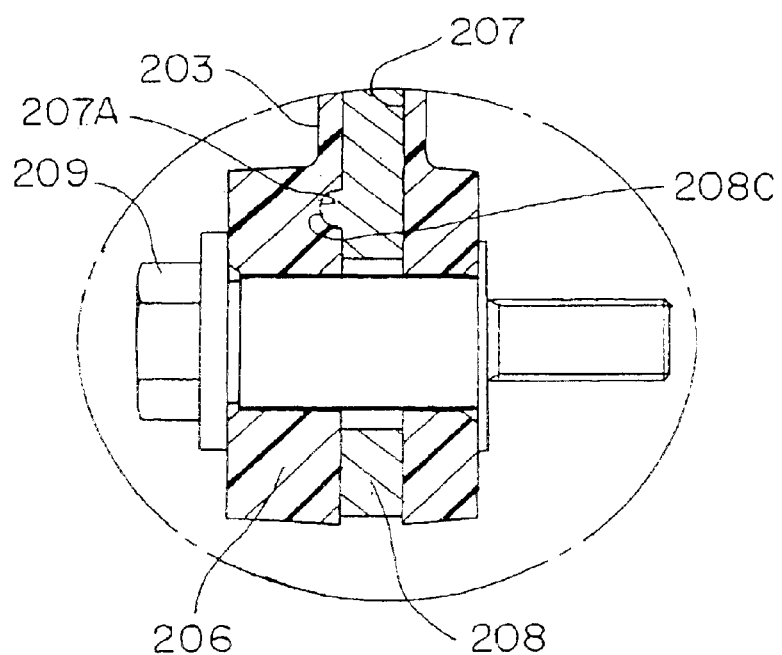
FIG. 7(b) is an enlarged view of a portion designated "VII$_B$" in FIG. 7(a)
Figure 8:
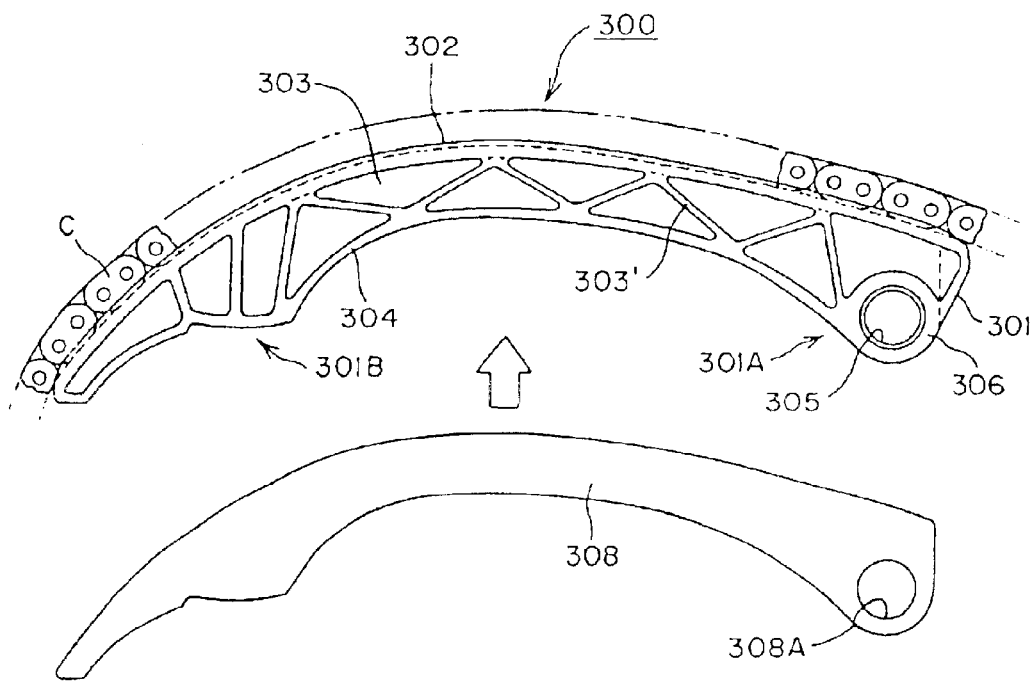
FIG. 8 is an exploded view of a conventional movable guide.
Figure 9:
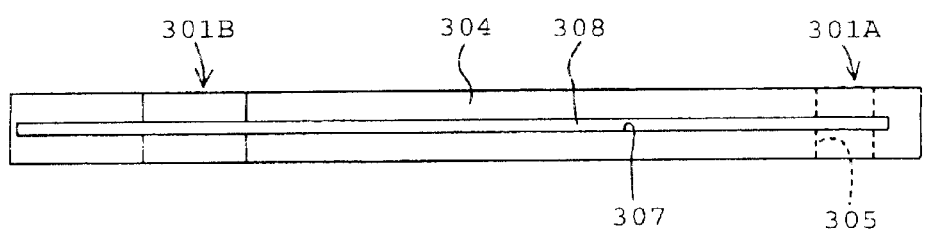
FIG. 9 is a bottom plan view of the conventional movable guide in FIG. 8.
Figure 10:
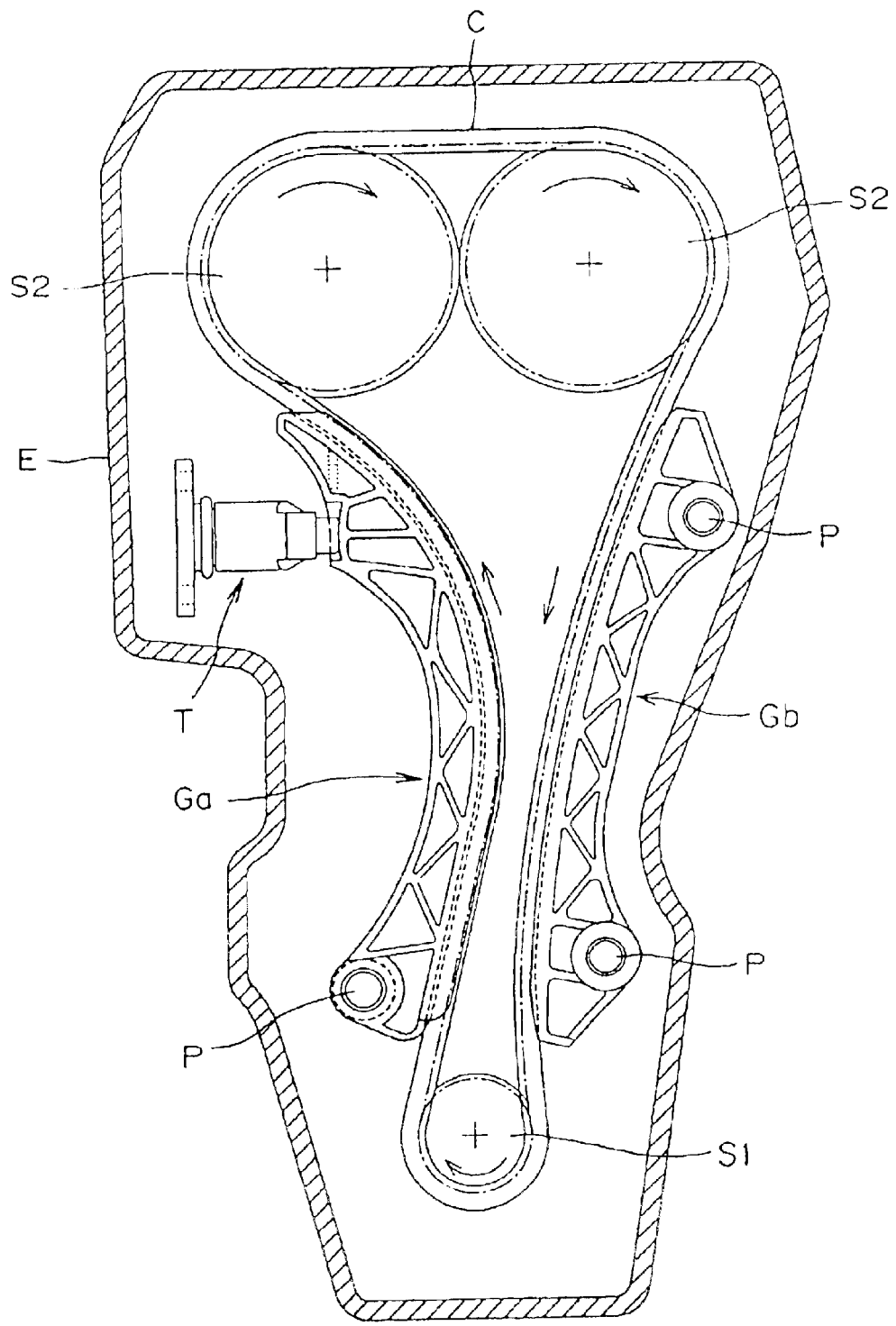
FIG. 10 is a schematic view showing the guide as used in the timing transmission of an engine.

In the example shown in FIGS. 6, 7(a) and 7(b), the through hole is elongated or oval in shape, having its long dimension d3 in the direction in which the reinforcing plate is inserted into the slot in the guide body. Dimension d3 is longer than the dimension d5 in the direction of elongation of the guide. With this dimensional relationship, positioning of the reinforcing plate 208 in the guide body 201 becomes easy, resulting in improved assembly efficiency.

As shown in FIGS. 7(a) and 7(b), a projection 208C is formed on a face of reinforcing plate 208 adjacent the through hole. This projection fits into a depression 207A formed on one of the inner walls of the slot adjacent the mounting hole in the plate-receiving portion 203 of the guide body 201. The projection 208C snaps into the depression 207A when the reinforcing plate is inserted into the slot of the guide body. The depression is provided at a position such that, when the projection and depression are engaged with each other, the center axis of the through hole and the center axis of the mounting hole coincide. In this way, the through hole of the guide is properly positioned in relation to the mounting hole of the guide body so that the inner periphery of the through hole cannot contact the mounting bolt. Various alternative locking schemes can be used. For example one or more projections can be formed on the inner wall of the slot for engagement with depressions formed in the reinforcing plate. Another example of a locking device is a hook (not shown) formed on, and projecting from the end of the reinforcing plate, for engagement with a hole formed in an end wall of the slot, the hook engaging the hole by a slight clockwise rotation of the reinforcing plate as it is inserted into the slot in the direction of the arrow of FIG. 6.

The more important advantages of the invention may be summarized as follows.

Since the diameter of the through hole bored in the reinforcing plate is larger than that of the mounting hole in the guide body, when the reinforcing plate is situated in the slot of the guide body and guide is supported on a shaft extending through the holes of both parts, the shaft is not contacted by the inner periphery of the reinforcing plate. Consequently objectionable metallic noise is avoided, and the noise due to the pivoting motion of the guide is remarkably reduced. Furthermore, wear in the through hole portion of the reinforcing plate is avoided, so that it is not necessary to subject the reinforcing plate to a strengthening process such as heat treatment or the like. Consequently, the production cost of the guide can be reduced. Additionally, distortion due to heat treatment and the like is also avoided and efficient insertion of the reinforcing plate into the slot of the movable guide in the assembly process is also improved. Since the shaft supports the inner walls of the two parts of the mounting hole, transverse vibration due to pivoting of the movable guide can also be significantly reduced.

When locking means are provided, the through hole bored in the reinforcing plate and the mounting hole bored in the guide body can be easily positioned so that they are on the same center axis. Thus, the assembly efficiency of the guide body and the reinforcing plate may be further enhanced, and the through hole and the mounting hole can be reliably locked in the proper position. Accordingly, even if excessive vibration has been applied to the movable guide, deformation of the reinforcing plate inserted into the guide body is prevented and the contact between the inner wall of the through hole in the reinforcing plate and the support shaft can be reliably avoided over a long period of time.

We claim:

1. A guide for a flexible traveling power transmission medium comprising an elongated guide body composed of an elongated shoe having a front surface for sliding contact with the power transmission medium and a back side, and a plate-receiving portion extending longitudinally along the back side of said shoe and having a longitudinally extending slot open in a direction opposite to the direction in which said front surface of the shoe faces, the shoe and plate-receiving portion being integrally molded as a unit from a synthetic resin, and a reinforcing plate fitting into said slot, wherein the guide body has a mounting hole adjacent one end of the guide body, and the reinforcing plate has a through hole adjacent one end of the reinforcing plate, the elongated mounting hole and the through hole being substantially coaxial with each other whereby an attachment means, inserted through said mounting and through holes can support the guide body and reinforcing plate on a frame of an engine, and wherein the diameter of said through hole is greater than the diameter of said mounting hole.

2. A plastic movable guide for a transmission device according to claim 1, including a locking means for positioning and locking said through hole and said mounting hole in coaxial relationship.

* * * * *